(12) United States Patent
Chen et al.

(10) Patent No.: US 11,044,474 B2
(45) Date of Patent: Jun. 22, 2021

(54) IMAGE COMPRESSION METHOD AND IMAGE PROCESSING SYSTEM

(71) Applicant: Shanghai Zhaoxin Semiconductor Co., Ltd., Shanghai (CN)

(72) Inventors: Ruiyang Chen, Shanghai (CN); Wei Wang, Shanghai (CN); Jin Shao, Shanghai (CN)

(73) Assignee: GLENFLY TECHNOLOGY CO., LTD., Shanghai (CN)

( * ) Notice: Subject to any disclaimer, the term of this patent is extended or adjusted under 35 U.S.C. 154(b) by 24 days.

(21) Appl. No.: 16/522,799

(22) Filed: Jul. 26, 2019

(65) Prior Publication Data
US 2020/0267386 A1 Aug. 20, 2020

(30) Foreign Application Priority Data

Feb. 18, 2019 (CN) .......................... 201910119830.9
Feb. 18, 2019 (CN) .......................... 201910119836.6

(51) Int. Cl.
*H04N 19/119* (2014.01)
*G06T 1/60* (2006.01)
*H04N 19/172* (2014.01)

(52) U.S. Cl.
CPC .............. *H04N 19/119* (2014.11); *G06T 1/60* (2013.01); *H04N 19/172* (2014.11)

(58) Field of Classification Search
CPC ...... H04N 19/88; H04N 19/91; H04N 19/119; H04N 19/172; H04N 19/593; G06T 1/60; G06T 9/00; G06T 15/405; G09G 2340/02
See application file for complete search history.

(56) References Cited

U.S. PATENT DOCUMENTS

| 2007/0165959 | A1* | 7/2007 | Takada | H04N 19/124 382/240 |
| 2010/0299454 | A1* | 11/2010 | Lyashevsky | H04N 19/96 709/247 |
| 2015/0249824 | A1* | 9/2015 | Takada | H04N 19/507 382/232 |
| 2016/0044311 | A1* | 2/2016 | Takada | H04N 19/174 375/240.02 |
| 2017/0105023 | A1* | 4/2017 | Marchya | H04N 19/107 |
| 2017/0269709 | A1* | 9/2017 | Yamasaki | G06T 7/248 |

FOREIGN PATENT DOCUMENTS

CN 108141586 A 6/2018

* cited by examiner

*Primary Examiner* — Edward F Urban
*Assistant Examiner* — Wassim Mahrouka
(74) *Attorney, Agent, or Firm* — McClure, Qualey & Rodack, LLP

(57) ABSTRACT

An image compression method is provided. The image compression method includes steps of receiving, by a tile division generator, an input image; by the tile division generator, determining whether the input image corresponds to a partial updated region and whether the partial updated region coincides with one tile or a combination of tiles of a current frame and generating a determination result; and by the tile division generator, determining whether to re-perform tile division and compressing and encoding one portion of the current frame according to the determination result.

10 Claims, 11 Drawing Sheets

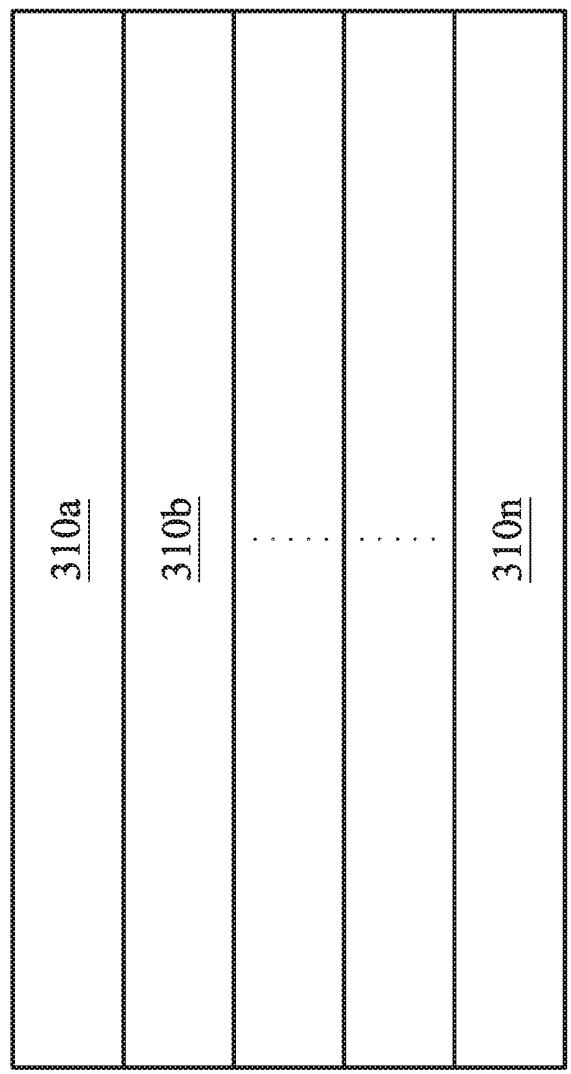

IMAGE COMPRESSION METHOD AND IMAGE PROCESSING SYSTEM

CROSS REFERENCE TO RELATED APPLICATIONS

This Application claims priority of China Patent Application No. 201910119836.6, filed on Feb. 18, 2019, the entirety of which is/are incorporated by reference herein.

This Application claims priority of China Patent Application No. 201910119830.9, filed on Feb. 18, 2019, the entirety of which is/are incorporated by reference herein.

BACKGROUND OF THE INVENTION

Field of the Invention

The present invention relates to an image compression method and an image processing system.

Description of the Related Art

Since panel driving chips have the characteristics of low cost and low power consumption, in order to reduce the cost of frame buffers, input images are usually compressed to save the storage space for the input images. Current tile-based compression technology can be divided into two types: The first one is based on a tile having a fixed large size (as shown in FIG. 1A, one region 110 corresponds to one tile, the image 100a is divided into eight tiles, and a partial updated region 150 is located in the first to third tiles), and its features include high correlation between primitives, a large compression ratio, and better image quality at the same compression ratio. However, this compression technique is less flexible for partial updating, especially if the partial updated region covers multiple tiles or has a narrow width. The second type is based on a tile having a fixed small size (as shown in FIG. 1B, one region 120 corresponds to one tile, that is, the image 100a is divided into 192 tiles. Compared to the tile 110 of FIG. 1A, the size of the tile 120 is significantly smaller than the size of the tile 110), and its features include better flexibility and preferable support for partial updating. However, this compression technique has poor correlation between primitives and a less compression ratio, and obvious image distortion can be seen visually. Therefore, how to provide a better compression ratio and maintain a certain degree of flexibility in the cases where only an input image corresponding to a partial updated region is provided on the input terminal is a problem to be solved at present.

BRIEF SUMMARY OF THE INVENTION

An exemplary embodiment of an image compression method is provided. The image compression method comprises the following steps: of receiving, by a tile division generator, an input image; by the tile division generator, determining whether the input image corresponds to a partial updated region and whether the partial updated region coincides with one tile or a combination of tiles of a current frame and generating a determination result; and by the tile division generator, determining whether to re-perform tile division and compressing and encoding one portion of the current frame according to the determination result.

An exemplary embodiment of an image processing system is provided. The image processing system comprises a tile division generator, an encoder, a frame buffer and a decoder. The tile division generator receives an input image, determines whether the input image corresponds to a partial updated region and whether the partial updated region coincides with one tile or a combination of tiles of a current frame, generates a determination result, and determines whether to re-perform tile division according to the determination result.

According to an embodiment, in response to the input image corresponding to the partial updated region and the partial updated region coinciding with the tile or the combination of tiles of the current frame, the encoder further compresses and encodes the input image corresponding to the partial updated region to generate image data corresponding to the partial updated region and stores the image data corresponding to the partial updated region into the frame buffer.

According to another embodiment, the tile division generator further obtains location information corresponding to a non-updated region according to location information corresponding to the partial updated region to output a partial updating signal to the decoder, the decoder further accesses image information corresponding to the non-updated region from the frame buffer according to the partial updating signal and stores the image information corresponding to the non-updated region into the frame buffer, and the decoder outputs a next frame according to the image data corresponding to the partial updated region and the image information corresponding to the non-updated region.

According to another embodiment, in response to the input image corresponding to the partial updated region and the partial updated region not coinciding with the tile or the combination of tiles of the current frame, the tile division generator re-performs the tile division according to size of the partial updated region, so that the tile coincides with the partial updated region. The tile division generator obtains location information corresponding to a non-updated region according to location information corresponding to the partial updated region to output a partial updating signal to the decoder. The decoder accesses image information corresponding to the non-updated region from the frame buffer according to the partial updating signal. The encoder compresses and encodes the input image corresponding to the partial updated region and the image information corresponding to the non-updated region to generate image data corresponding to a next frame and further stores the image data corresponding to the next frame into the frame buffer.

According to another embodiment, in response to the input image corresponding to a complete image, the tile division generator further sets size of the tile to be the same as size of the complete image, and the encoder compresses and encodes the complete image to obtain image data corresponding to a next frame and further stores the image data corresponding to a next frame into the frame buffer A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein:

FIGS. 3A-3C are schematic diagrams showing tile division according to an embodiment of the present invention;

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

It is to be understood that the terms "comprising" and "including", used in this specification, are used to indicate the presence of particular technical features, numerical values, method steps, operation processing, elements and/or components. However, it is not excluded that more technical features, numerical values, method steps, operation processing, elements, components, or any combination of the above may be added.

Figure 1A:
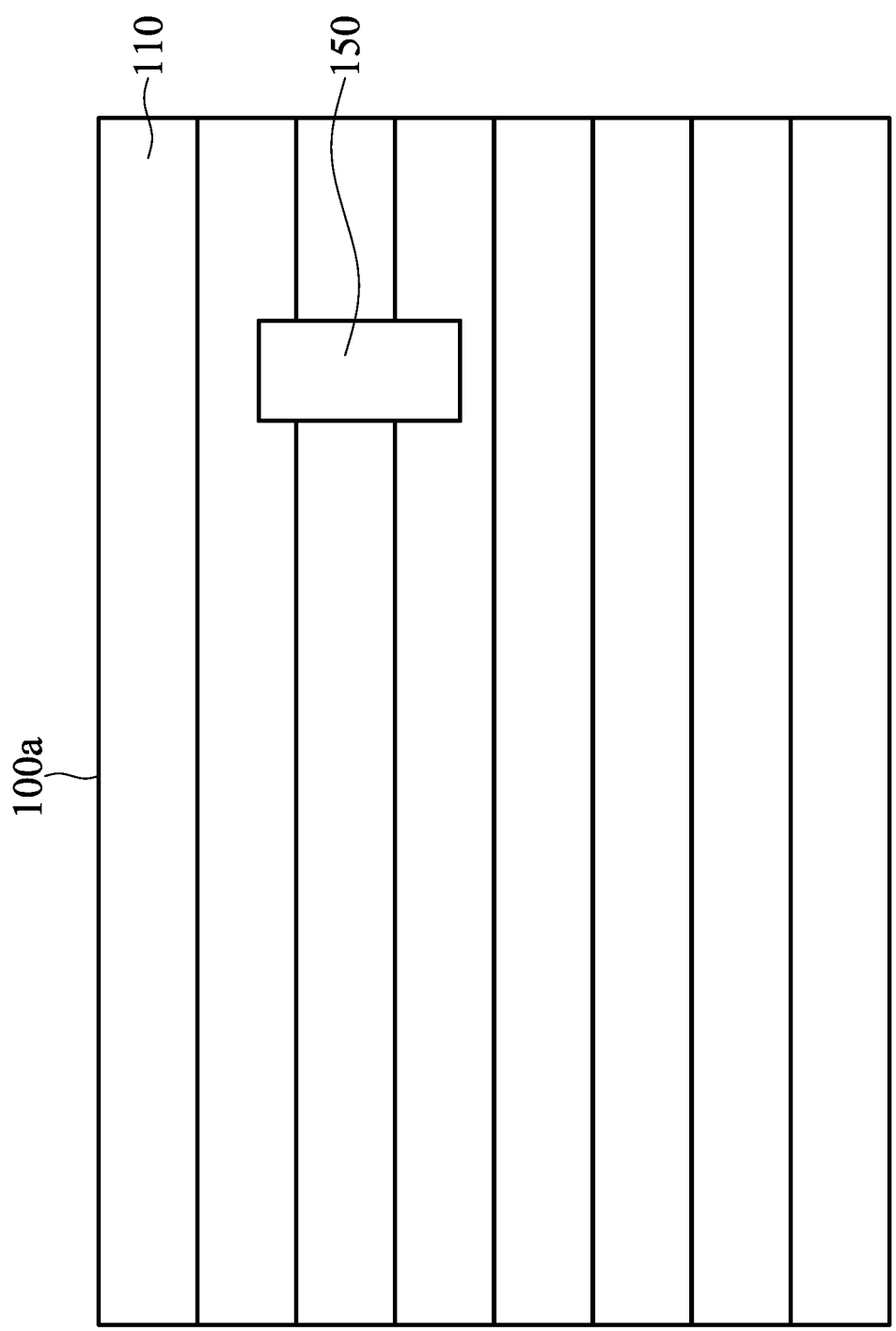
FIGS. 1A and 1B are schematic diagrams showing conventional tile division.
Figure 1B:
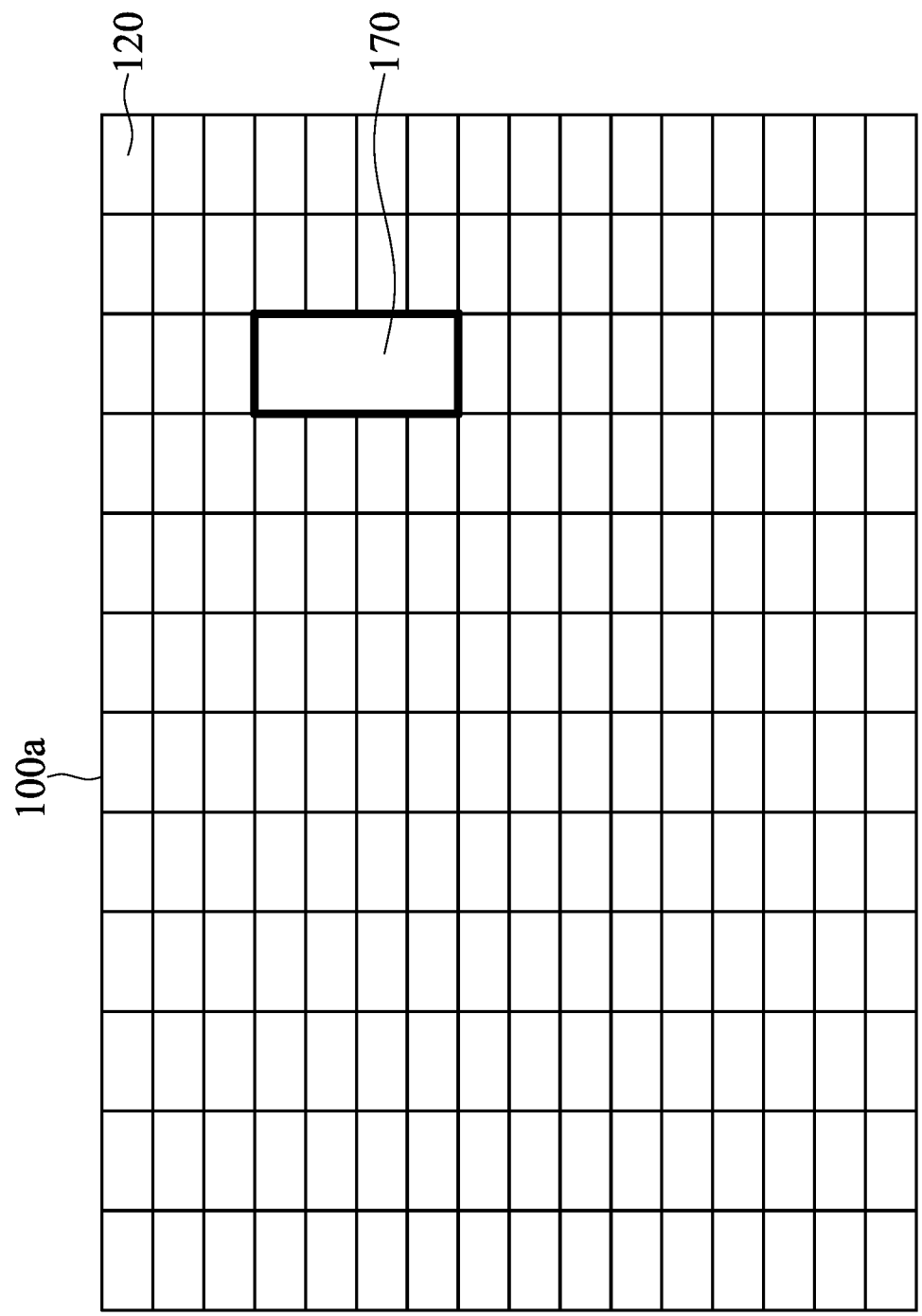
Figure 2:
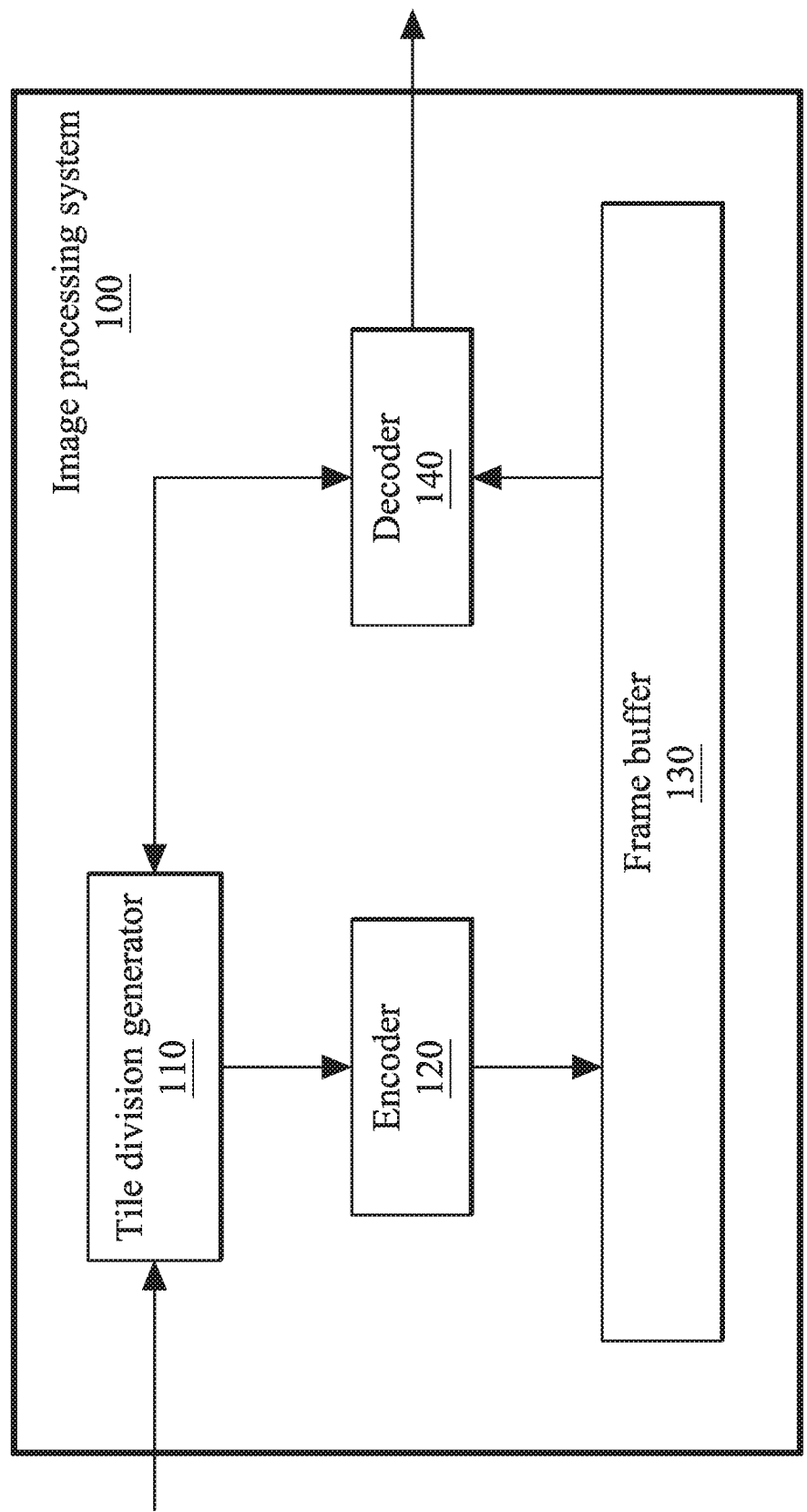
FIG. 2 is a block diagram showing an image processing system according to an embodiment of the present invention.

FIG. 2 is a block diagram showing an image processing system according to an embodiment of the present invention. As shown in FIG. 2, an image processing system 100 comprises at least a tile division generator 110, an encoder 120, a frame buffer 130, and a decoder 140. The tile division generator 110 is configured to receive an input image from the operating system (OS) and, according to the type of the input image, determine whether it needs to access partial image information (such as pixel values, etc.) corresponding from the frame buffer 130 to generate image information corresponding to the next frame. The types of the images output by the operating system include a complete image corresponding to the entire frame or an image corresponding only to a partial updated region. In response to the input image being an image corresponding to a partial updated region, the operating system further outputs location information corresponding to the partial updated region. The encoder 120 is configured to compress and encode the image information output by the tile division generator 110 and store it into the frame buffer 130. The decoder 140 is configured to access image data corresponding to the next frame from the frame buffer 130 and decode the image data for a displayer (not shown) to display an image corresponding to the next frame. In addition, in response to the input image being the image corresponding to the partial updated region, the decoder 140 further receives the location information corresponding to the partial updated region from the tile division generator 110, obtains location information corresponding to a non-updated region according to the received location information to decode image information corresponding to the non-updated region, and transmits the decoded image information back to the tile division generator 110. It should be noted that the image processing system 100 may further comprise other components, and the configuration of the components may vary from system to system and may be presented in various different manners, which is not limited to the example of FIG. 2. In addition, the tile division generator 110 can be implemented by a logic circuit.

According to an embodiment of the invention, in response to the input image received by the tile division generator 110 being a complete image, the tile division generator 110 sets the size of the tile to be the same as the size of the complete image and outputs the input image to the encoder 120. Then, the encoder 120 compresses and encodes the input image to generate image data corresponding to the input image and stores it into the frame buffer 130. Finally, when the image corresponding to the next frame is displayed, the decoder 140 can decode the image data stored in the frame buffer 130 to obtain image information corresponding to the next frame.

According to another embodiment of the present invention, in response to the input image, which is received by the tile division generator, corresponding to a partial updated region and the partial updated region coinciding with the divided tile or the combination of the divided tiles of the current frame, the tile division generator 110 transmits location information corresponding to the partial updates region to the decoder 140, so that the decoder 140 can calculate location information corresponding to the non-updated region according to the location information corresponding to the partial updates region to access image data corresponding to the non-updated region from the frame buffer 130 and decode it. Then, the decoder 140 transmits the image information which is obtained after the decoding and corresponds to the non-updated region back to the tile division generator 110, so that the tile division generator 110 can combine the image information corresponding to the non-updated region and the image information of the input image to form image information corresponding to the next frame and store it into the frame buffer 130. Wherein, since the image information corresponding to the partial updated region is different from the image information of the previous frame, the encoder 120 re-compresses and re-encodes the input image. In addition, since the image information corresponding to the non-updated region is the same as the image information of the previous frame, that is, the correlation between the primitives during encoding does not change, the encoder 120 does not need to re-encode the non-updated region, thereby increasing the efficiency of image compression.

According to another embodiment of the present invention, in response to the input image corresponding to the partial updated region and the partial updated region not coinciding with the divided tile or the combination of the divided tiles of the current frame, the tile division generator 110 re-perform the tile division according to the size and location of the partial updated region. For example, as shown in FIG. 3A, in the image corresponding to the current frame, the tile division generator 110 has divided the entire image 300 into a plurality of strips 310a-310n with the same height (as shown in FIG. 3A) and performed the compression and encoding for each strip. However, since the height of the new partial updated region is smaller than the height of the strips 310a-310n, the tile partition division generator 110 further divides the strip where the partial updated region is located and re-performs the compression and encoding for the strip where the partial updated region is located.

Figure 3B:
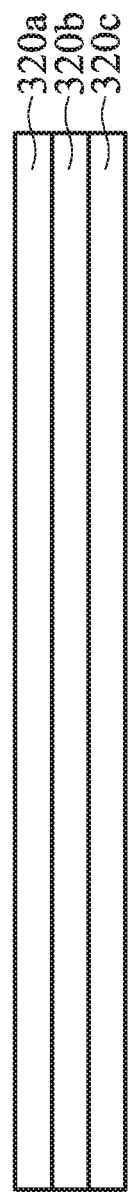
Figure 3C:
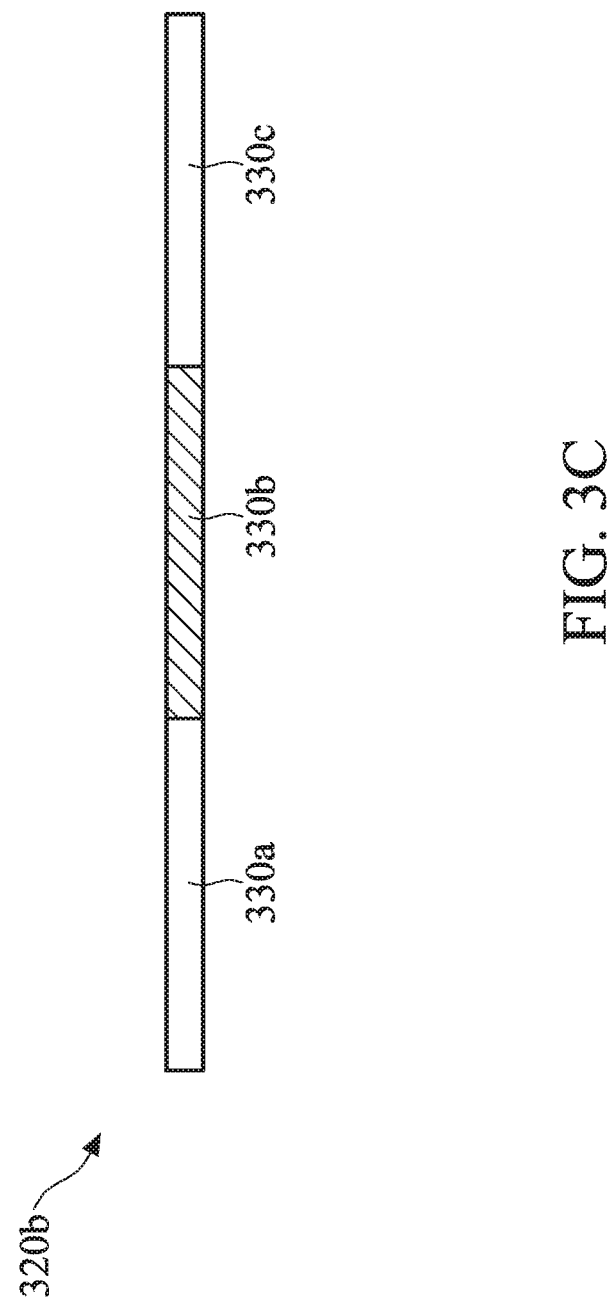

For example, in response to the partial updated region being located in the strip 310a and having a height less than the height of the strip 310a, the tile division generator 110 further divides the strip 310a into a plurality of sub-strips 320a-320n with the same height (as shown in FIG. 3B, in this embodiment, the strip 310a is divided into three sub-strips 320a-320c). The tile division generator 110 then determines whether the height of the divided sub-strips 320a-320n is the same as the height of the partial updated region and whether the partial updated region coincides with at least one of the divided sub-strips 320a-320n. In the embodiment, if the height of the partial updated region is exactly the same as the height of each of the sub-strips 320a-320c and the partial updated region coincides with the sub-strip 320b, the tile division generator 110 determines whether the width of the partial updated region is the same as the width of the sub-strip 320b. For example, as shown in FIG. 3C, the partial updated region is at the location 330b, but the width of the partial updated region is still smaller than the width of the sub-strip 320b, so the tile division generator 110 divides the sub-strip 320b into three tiles 330a-330c based on the location of the partial updated region. Finally, after the tile division generator 110 completes the division of the tiles, the encoder 120 compresses and re-encodes image information corresponding to the non-updated region and the image information of the partial updated region corresponding to the input image and stores the image data which is obtained after the re-encoding into the frame buffer 130. Wherein, the image information corresponding to the non-updated region is the image information of the corresponding location in the current frame which is previously read from the frame buffer 130 by the decoder 140.

It is worth noting that when the tile division generator 110 performs the division of the tiles on strips or sub-strips based on the width of the partial updated region, the tile size corresponding to the partial updates region may be different from the size of other tiles. In other words, when the tile division generator 110 performs vertical division, it is not necessary to perform the tile division by the same size of tiles. In addition, after the tile division generator 110 completes the division of the tiles, the tile division generator 110 further stores location information corresponding to each tile in a tile information recording table which is provided for the tile division generator 110 to determine whether it needs to re-perform the tile division based on the position of the next input image.

Figure 4A:
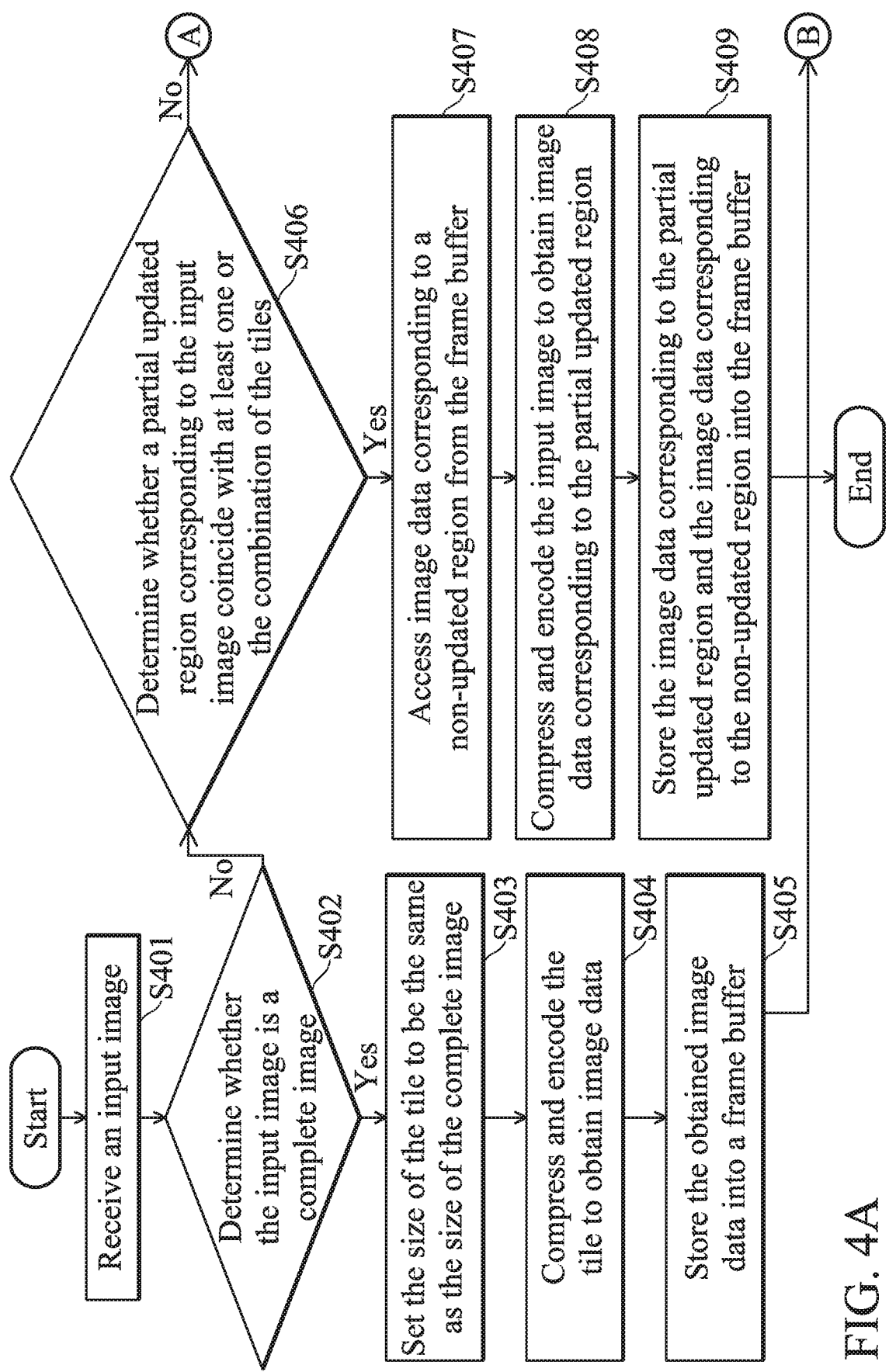
FIGS. 4A and 4B are flowcharts showing an image compression method according to an embodiment of the present invention.
Figure 4B:
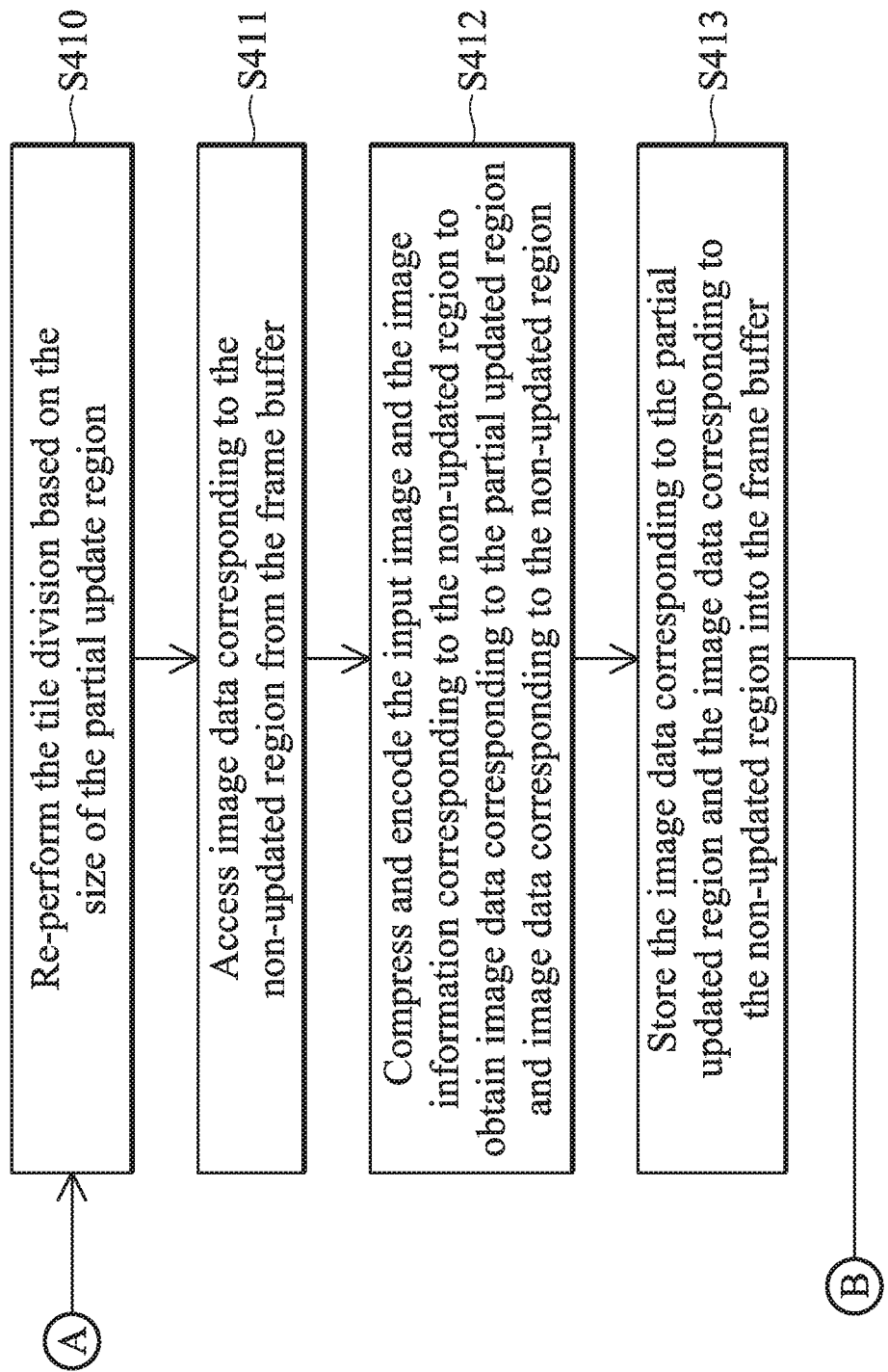

FIGS. 4A and 4B are flowcharts showing an image compression method according to an embodiment of the present invention. In S401, the tile division generator 110 receives an input image and location information corresponding to the input image. In S402, the tile division generator 110 determines whether the input image is a complete image. In response to the input image being a complete image, the method proceeds to step S403, and the tile division generator 110 sets the size of the tile to be the same as the size of the complete image. The tile division generator 110 compresses and encodes the tile through the encoder 120 to obtain image data corresponding to the next frame (step S404) and stores the obtained image data into the frame buffer 130 (step S405).

On the contrary, in response to the input image corresponding to a partial updated region, the method proceeds to step S406. In step S406, the tile division generator 110 determines whether the partial updated region corresponding to the input image coincide with at least one or the combination of the tiles according to the size and the locations of the tiles recorded in a tile information recording table. Wherein, in response to the partial updated region coinciding with at least one or the combination of the tiles, the method proceeds to step S407. In step S407, the tile division generator 110 transmits the location corresponding to the partial updated region to the decoder 140, so that the decoder 140 calculates a location corresponding to a non-updated region according to the location corresponding to the partial updates region to access image data corresponding to the non-updated region from the frame buffer 130. In step S408, the encoder 120 compresses and encodes the image information corresponding to the input image to obtain image data corresponding to the partial updated region. In step S409, the encoder 120 stores the image data corresponding to the partial updated region and the image data corresponding to the non-updated region into the frame buffer 130.

However, in response to the partial updated region coinciding with at least one or the combination of the tiles, the method proceeds to step S410. In step S410, the tile division generator 110 re-performs the tile division based on the size of the partial update region, so that the tile coincides with the partial updated region. In step S411, for the non-updated region, the tile division generator 110 further calculates the location of the non-updated region according to the location of the partial updated region, so as to access the image data corresponding to the non-updated region from the frame buffer 130 through the decoder 140. In step S412, the encoder 120 re-compresses and re-encodes the input image and the image information corresponding to the non-updated region to obtain image data corresponding to the partial updated region and image data corresponding to the non-updated region. Finally, in step S413, the encoder 120 stores the image data corresponding to the partial updated region and the image data corresponding to the non-updated region into the frame buffer 130 for the decoder 140 to perform decoding and output decoded image data to the displayer.

Figure 5:
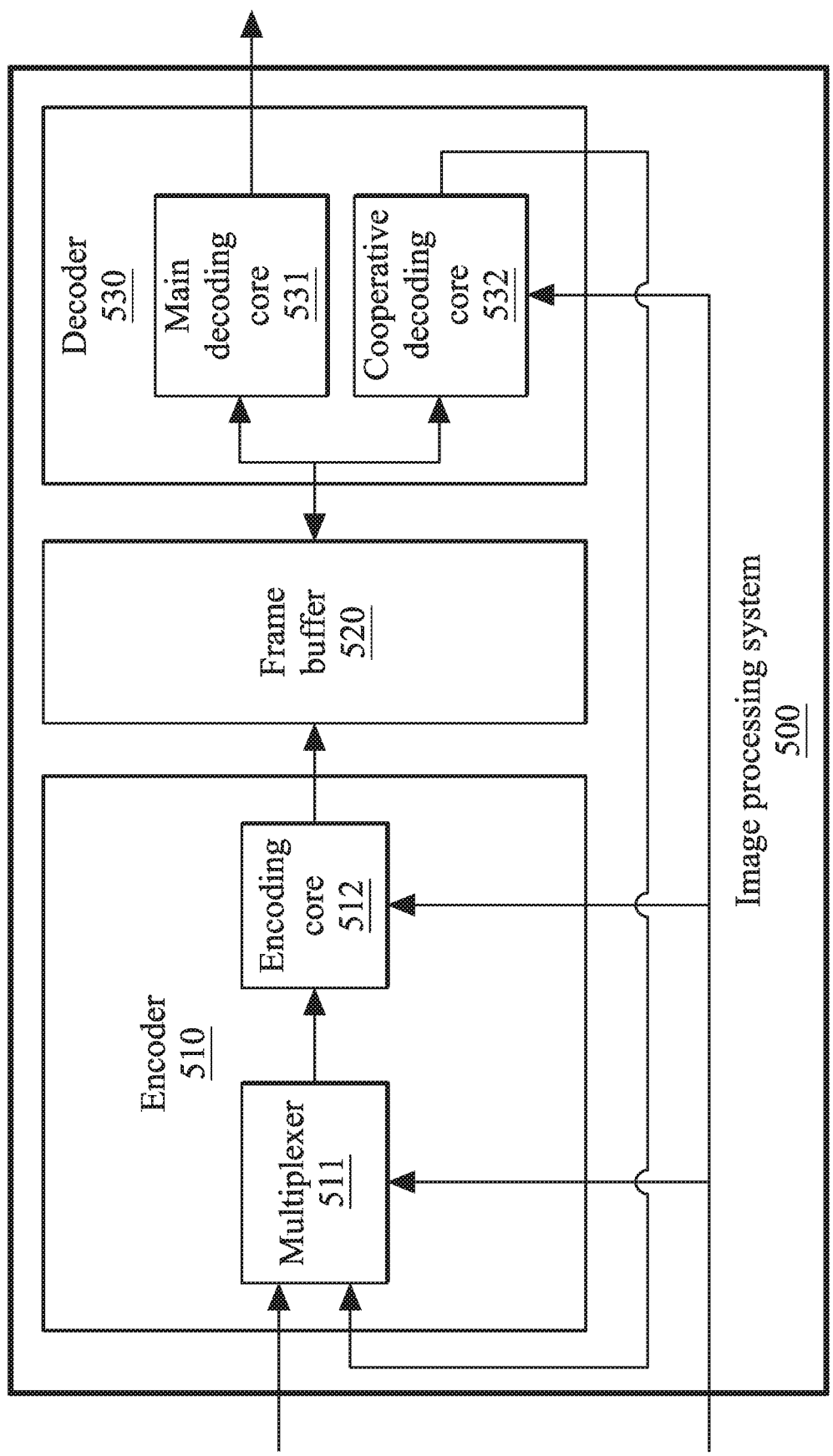
FIG. 5 is a block diagram showing an image processing system according to another embodiment of the present invention.

FIG. 5 is a block diagram showing an image processing system according to another embodiment of the present invention. As shown in FIG. 5, an image processing system 500 at least comprises an encoder 510, a frame buffer 520, and a decoder 530. The encoder 510 at least comprises a multiplexer 511 and an encoding core 512. The multiplexer 511 is configured to receive image information corresponding to a partial updated region and location information corresponding to the partial updated region and output the image information to the encoding core 512 according to the location of the partial updated region, so that the encoding core 512 can compress and encode the image information. The frame buffer 520 is used to store image data corresponding to one frame. The decoder 530 at least comprises a main decoding core 531 and a cooperative decoding core 532. The main decoding core 531 is configured to access image data corresponding to the next frame from the frame buffer 520, decode the image data, and output the image information, which is obtained after the decoding to a displayer (not shown). The cooperative decoding core 532 is configured to decode the tiles involved in the partial updated region and transmit the image information, which is obtained after the decoding, back to the multiplexer 511. The multiplexer 511 may further comprise a buffer for temporarily storing the image information received from the cooperative decoding core 532.

Figure 6:
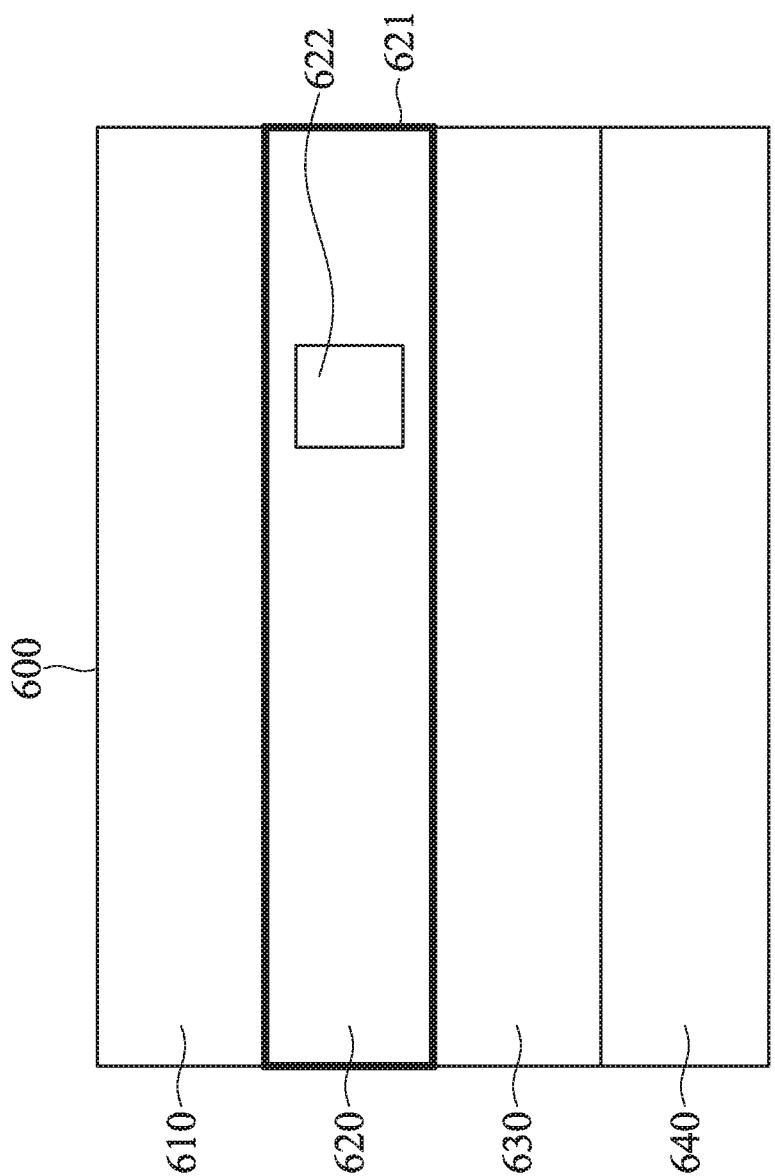
FIG. 6 is schematic diagram showing tile division according to another embodiment of the present invention.

According to an embodiment of the invention, in response to the multiplexer 511 receiving an input image from an operating system (wherein the input image corresponds to a partial updated region), the cooperative decoding core 532 accesses image data of the tile corresponding to the partial updated region from the frame buffer according to location information of the input image (which is provided by the operating system), decodes it, and transmits image information, which is obtained after the decoding, back to the multiplexer 511. Then, the encoding core 512 re-compresses and re-encodes the tile according to a location corresponding to the partial updated region and the image information corresponding to the tile transmitted by the cooperative decoding core 532 to refresh the image data which is original stored in the frame buffer 520. For example, as shown in FIG. 6, the region 622 is a partial updated region, the region 621 is a non-updated region, and the area 620 is a tile corresponding to the partial updated region. According to the method of the present invention, in response to the multiplexer 511 receiving image information and location information corresponding to the region 622, the cooperative decoding core 532 accesses image data corresponding to the tile 620 from the frame buffer 520 according to location information received from the operating system, decodes it, and transmits image information (that is, the pixels included in the tile 620), which is obtained after the decoding and corresponds to the tile 620, back to the multiplexer 511. After receiving the image information corresponding to the tile 620, the multiplexer 511, according to the position of the partial updated region, outputs the image information corresponding to the block 620 and the image information corresponding to the partial updated region to the encoding core 512 sequentially, so that the encoding core 512 can re-perform the compression and encoding on the pixels in the tile sequentially to generate image data corresponding to the next frame.

It should be noted that, in this embodiment, although the size of the partial updated region is smaller than the size of the tile, the encoder 510 does not change the size of the tile but re-performs the encoding on the tile corresponding to the partial updated region.

Figure 7:
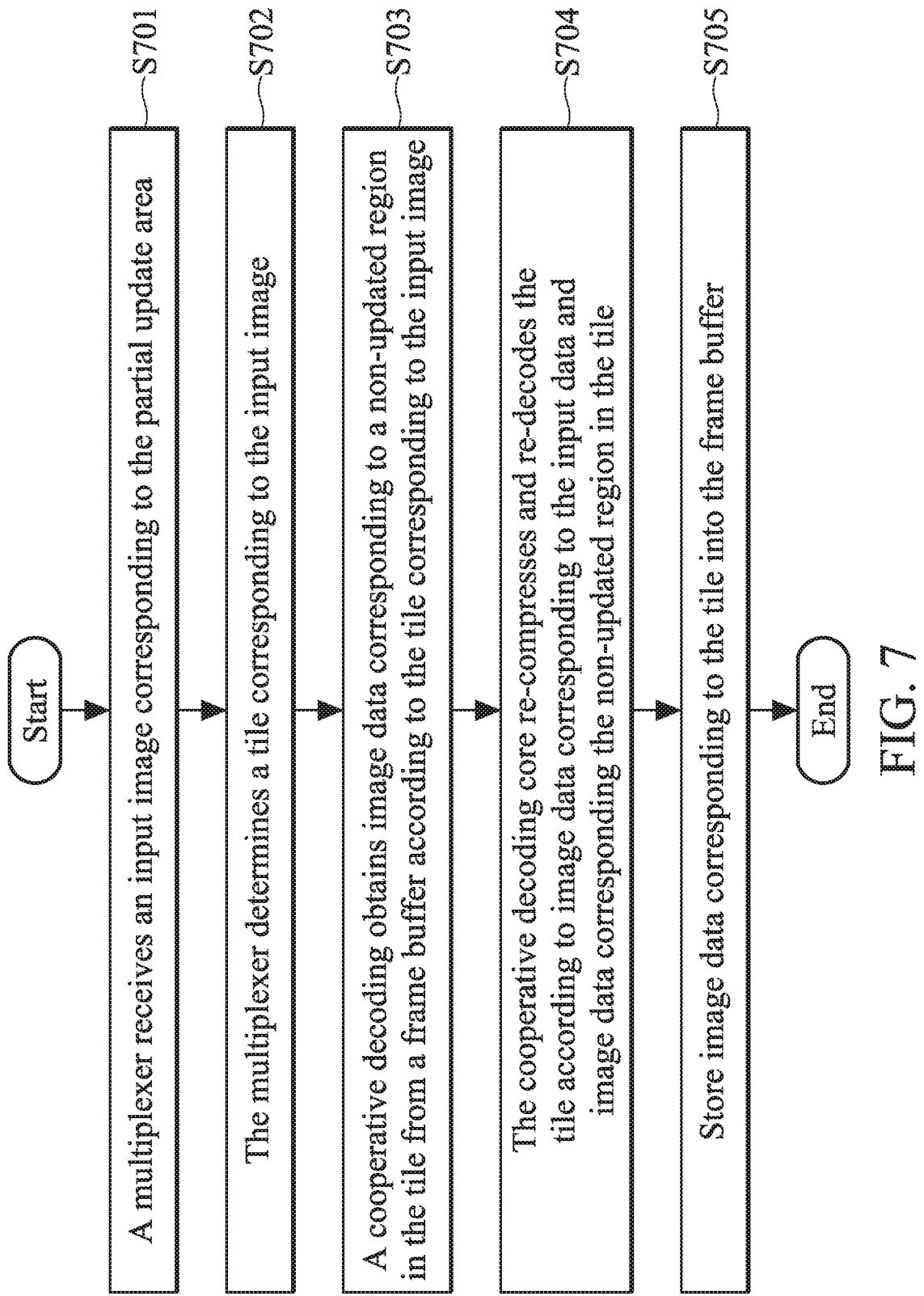
FIG. 7 is a flow chart showing an image compression method according to another embodiment of the present invention.

FIG. 7 is a flow chart showing an image compression method according to another embodiment of the present invention. In step S701, the multiplexer 511 receives an input image corresponding to the partial update area from the operating system. In step S702, the multiplexer 511 determines a tile corresponding to the input image and enables the cooperative decoding core 532 to access image data corresponding to the tile from the frame buffer 520 according to the tile corresponding to the input image. The cooperative decoding core 532 decodes the image data and transmits the decoded image data to the multiplexer 511 (step S703). In step S704, the multiplexer 511 outputs the pixels to the encoding core 512 sequentially according to location information corresponding to the partial updated region, so that the encoding core 512 can re-compress and re-encode image information corresponding to the input image and image information corresponding to a non-updated region in the tile. Finally, in step S705, the encoding core 512 stores image data corresponding to the tile and image data corresponding to the non-updated region into the frame buffer 520 for the primary decoding core 531 to access and perform the decoding before the next frame is displayed.

It is to be noted that although the above method has been described on the basis of a series of steps or a flow chart of blocks, the present invention is not limited to the order of the steps. Some steps may be performed in a sequence different from the sequence of the remaining steps or the remaining steps can be performed simultaneously. In addition, those skilled in the art will understand that the steps shown in the flow chart are not exclusive. The flow chart may comprise other steps, or one or more steps of the flow chart may be deleted without departing from the scope of the invention.

In summary, according to the image processing system and the image compression method of the present invention, the present invention can flexibly support partial updated regions with various sizes while maximally retaining correlation between primitive values. In the cases where the compression ratio reaches ½ or even ⅓, the subjective vision is guaranteed to be not degraded. Moreover, when a partial updated region does not coincide with any existing tile, the tile division can be adaptively re-performed to achieve the best quality for the compressed decoded images. In addition, the hardware module involved in the present invention is simple in design, uses less gate circuits, and has low power consumption. Thus, the hardware module is suitable for various types of panel driving chips.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An image compression method comprising:
   dividing, by a tile division generator, a current frame into a plurality of tiles;
   receiving, by the tile division generator, an input image;
   by the tile division generator, determining whether the input image corresponds to a partial updated region and whether the partial updated region coincides with one tile or a combination of more than one tile among the plurality of tiles of the current frame and generating a determination result; and
   by the tile division generator, determining whether to re-perform tile division by changing height or width of at least one of the plurality of tiles of the current frame and compressing and encoding one portion of the current frame according to the determination result.

2. The image compression as claimed in claim 1, further comprising:
   in response to the input image corresponding to the partial updated region and the partial updated region coinciding with the tile or the combination of more than one tile among the plurality of tiles of the current frame, by an encoder, compressing and encoding the input image corresponding to the partial updated region to generate image data corresponding to the partial updated region; and
   storing the image data corresponding to the partial updated region into a frame buffer.

3. The image compression as claimed in claim 2, further comprising:
   by the tile division generator, obtaining location information corresponding to a non-updated region according to location information corresponding to the partial updated region to output a partial updating signal to a decoder;
   by the decoder, accessing image information corresponding to the non-updated region from the frame buffer according to the partial updating signal;
   storing the image information corresponding to the non-updated region into the frame buffer; and
   by the decoder, outputting a next frame according to the image data corresponding to the partial updated region and the image information corresponding to the non-updated region.

4. The image compression as claimed in claim 1, further comprising:

in response to the input image corresponding to the partial updated region and the partial updated region not coinciding with the tile or the combination of more than one tile among the plurality of tiles of the current frame, by the tile division generator, re-performing the tile division according to size of the partial updated region, so that the tile coincides with the partial updated region;

by the tile division generator, obtaining location information corresponding to a non-updated region according to location information corresponding to the partial updated region to output a partial updating signal to a decoder;

by the decoder, accessing image information corresponding to the non-updated region from a frame buffer according to the partial updating signal;

by an encoder, compressing and encoding the input image corresponding to the partial updated region and the image information corresponding to the non-updated region to generate image data corresponding to a next frame; and storing the image data corresponding to the next frame into the frame buffer.

5. The image compression as claimed in claim 1, further comprising:

in response to the input image corresponding to a complete image, by the tile division generator, setting size of the tile to be the same as size of the complete image;

by an encoder, compressing and encoding the complete image to obtain image data corresponding to a next frame; and storing the image data corresponding to a next frame into a frame buffer.

6. An image processing system comprising:

a tile division generator configured to:

divide a current frame into a plurality of tiles;

receive an input image;

determine whether the input image corresponds to a partial updated region and whether the partial updated region coincides with one tile or a combination of more than one tile among the plurality of tiles of the current frame and generate a determination result; and determine whether to re-perform tile division by changing height or width of at least one of the plurality of tiles of the current frame according to the determination result;

an encoder configured to compress and encode one portion of the current frame according to the determination result;

a frame buffer configured to store the input image and the current frame; and a decoder configured to decode the current frame.

7. The image processing system as claimed in claim 6, wherein in response to the input image corresponding to the partial updated region and the partial updated region coinciding with the tile or the combination of more than one tile among the plurality of tiles of the current frame, the encoder further compresses and encodes the input image corresponding to the partial updated region to generate image data corresponding to the partial updated region and stores the image data corresponding to the partial updated region into the frame buffer.

8. The image processing system as claimed in claim 7, wherein the tile division generator further obtains location information corresponding to a non-updated region according to location information corresponding to the partial updated region to output a partial updating signal to the decoder, the decoder further accesses image information corresponding to the non-updated region from the frame buffer according to the partial updating signal and stores the image information corresponding to the non-updated region into the frame buffer, and the decoder outputs a next frame according to the image data corresponding to the partial updated region and the image information corresponding to the non-updated region.

9. The image processing system as claimed in claim 6, wherein:

in response to the input image corresponding to the partial updated region and the partial updated region not coinciding with the tile or the combination of more than one tile among the plurality of tiles of the current frame, the tile division generator re-performs the tile division according to size of the partial updated region, so that the tile coincides with the partial updated region, the tile division generator obtains location information corresponding to a non-updated region according to location information corresponding to the partial updated region to output a partial updating signal to the decoder, the decoder accesses image information corresponding to the non-updated region from the frame buffer according to the partial updating signal, and the encoder compresses and encodes the input image corresponding to the partial updated region and the image information corresponding to the non-updated region to generate image data corresponding to a next frame and further stores the image data corresponding to the next frame into the frame buffer.

10. The image processing system as claimed in claim 6, wherein in response to the input image corresponding to a complete image, the tile division generator further sets size of the tile to be the same as size of the complete image, and the encoder compresses and encodes the complete image to obtain image data corresponding to a next frame and further stores the image data corresponding to a next frame into the frame buffer.

* * * * *